United States Patent [19]
Schneider

[11] Patent Number: 5,259,579
[45] Date of Patent: Nov. 9, 1993

[54] CONTAINER HOLDER FOR A VEHICLE

[75] Inventor: Robert J. Schneider, Fennville, Mich.

[73] Assignee: Prince Corporation, Holland, Mich.

[21] Appl. No.: 865,175

[22] Filed: Apr. 8, 1992

[51] Int. Cl.$^5$ .................................................. A47C 7/00
[52] U.S. Cl. ................................... 248/311.2; 248/313; 297/194
[58] Field of Search .............. 248/311.2, 309.1, 316.4, 248/313, 523, 310, 316.7, 154; 297/194, 188; 22/737; 224/42.42, 42.45

[56] References Cited

U.S. PATENT DOCUMENTS

| 2,706,496 | 4/1955 | Bond | 248/55 X |
| 2,816,734 | 12/1957 | Crofoot | 248/55 X |
| 3,097,892 | 7/1963 | Newbury | 248/55 X |
| 3,215,388 | 11/1965 | Culver | 248/313 |
| 3,295,801 | 1/1967 | McDowall et al. | 248/55 X |
| 4,131,136 | 12/1978 | Sawyer | 248/55 X |
| 4,182,265 | 1/1980 | Bracher | 248/311.2 X |

Primary Examiner—Karen J. Chotkowski
Attorney, Agent, or Firm—Price, Heneveld, Cooper, DeWitt & Litton

[57] ABSTRACT

A container holder includes a container supporting platform with an aperture for receiving a container therein. A rim is formed under the platform and adjacent the aperture and supports a wire having a plurality of rollers operably mounted to legs of the wire formed in chordal segments of the aperture for engaging the sides of a container and holding a container centrally in the aperture.

25 Claims, 2 Drawing Sheets

CONTAINER HOLDER FOR A VEHICLE

BACKGROUND OF THE INVENTION

The present invention relates to container holders for vehicles, and in particular to one including means for receiving a variety of different sized containers therein.

A variety of container holders for vehicles have been designed which stabilize containers placed therein. For example, U.S. Pat. No. 4,792,184 to Lindberg et al., discloses a container holder including a cup-shaped floor support with arcuately-shaped resilient cup support members located around the periphery of an aperture formed in a floor support (FIG. 4 in Lindberg '184). The support members flexibly receive and stabilize a container placed in the aperture while allowing ready removal of the container. Also, Lindberg '184 discloses another container holder having rigid segments pivotally attached around an aperture and biased inwardly to engage a container placed therein (FIGS. 5–7 of Lindberg '184). These members movably receive and stabilize containers placed therein. However, in both of these examples, the insertion and removal force depends in part upon the frictional force generated by sliding the container past the support members engaging the container sides.

This sliding frictional force also changes with material used for the container holders as well as with the type of container and its material. Further, when condensation forms on a cold container, or if it has a sticky surface due to beverage spilled from carbonated drinks, the force required to move the container can vary widely. Further, the sidewalls of containers with weak sidewallss such as Styrofoam cups, may partially collapse as the engaging members of the container holder wedge against the container sidewalls thus creating a non-uniform force of withdrawal of the container. While this non-uniform force can be overcome, the "feel" is less than compatible with that expected in a high-technology or luxury automobile. Thus, a container holder is desired which solves the aforementioned problems while providing a reliable container holder with a minimum of parts and for a reasonable cost.

SUMMARY OF THE INVENTION

The present invention includes a container holder having a container supporting element with aperture means therein for receiving a container. The aperture means are defined by a resilient member over which there extends a plurality of roller means rotatably mounted to the resilient member and positioned to engage the sides of the container and freely roll as it is placed therein. Additionally, the container holder includes means for mounting the container holder to a vehicle preferably for movement between a storage and a use position.

The present invention offers several advantages over known prior art. The roller means create a substantially uniform and continuous force of insertion and withdrawal for containers placed in the container holder regardless of the materials or condition of the container. Further, the preferred embodiment permits use of relatively inexpensive and non-complex parts that permit ready assembly and long service life. Also, the design can be readily incorporated into a variety of existing storable container holder designs. Further, the stability provided by the container holders need not be compromised to provide an acceptable "feel" as an operator inserts or withdraws the container from the container holder.

DETAILED DESCRIPTION OF THE PREFERRED EMBODIMENT

Figure 1:
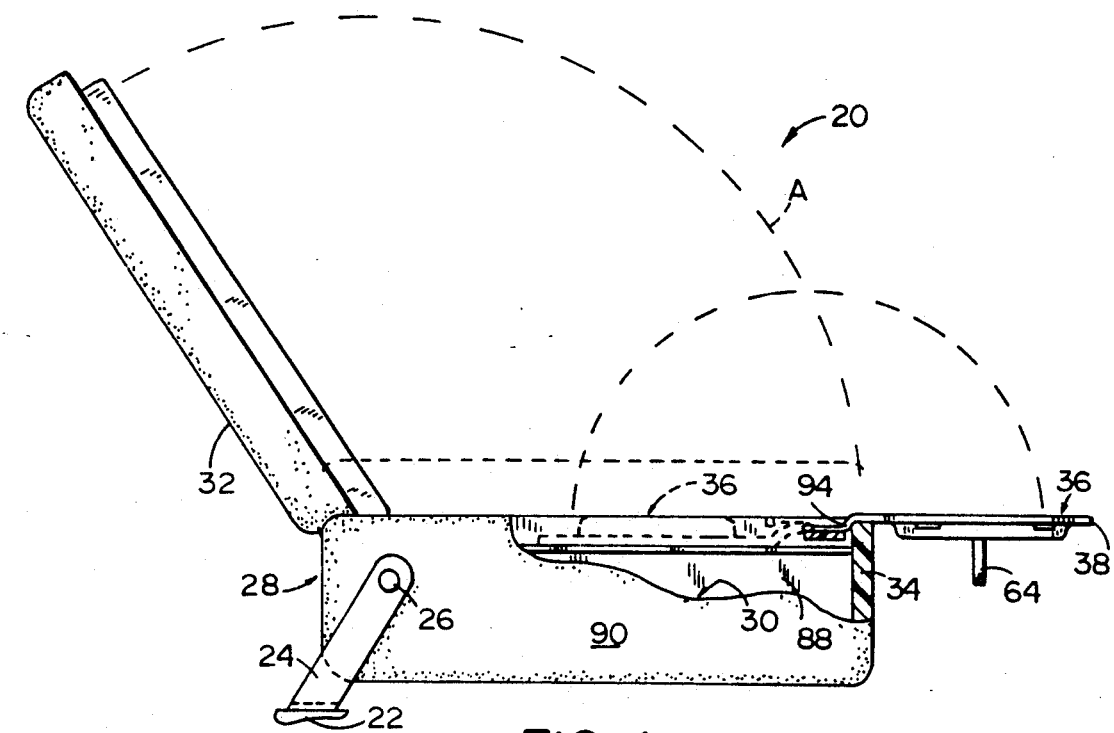
FIG. 1 is a right side elevational view, partly in phantom and partly broken-away, of an armrest including a container holder embodying the present invention.

Referring initially to FIG. 1, there is shown an armrest 20 which is secured to a vehicle 22 by one or more suitable mounting brackets 24. In the embodiment shown, bracket 24 pivotally mounts the armrest to the vehicle through pivot mounting member 26 such that the entire armrest can be lowered for use as shown, or raised for storage. The armrest 20 includes a lower storage housing 28 which defines an interior storage compartment 30. The armrest also includes a cover 32 which is pivoted along its rear edge to the rear of housing 28 such that it can be moved between a closed position shown in phantom form in FIG. 1, and an open position shown in solid form in FIG. 1 by pivoting in a direction indicated by arrow "A". Pivotally mounted to the forward edge of the inside of compartment 30 near the front wall 34 of housing 28 is a container holder 36 embodying the present invention.

Figure 5:
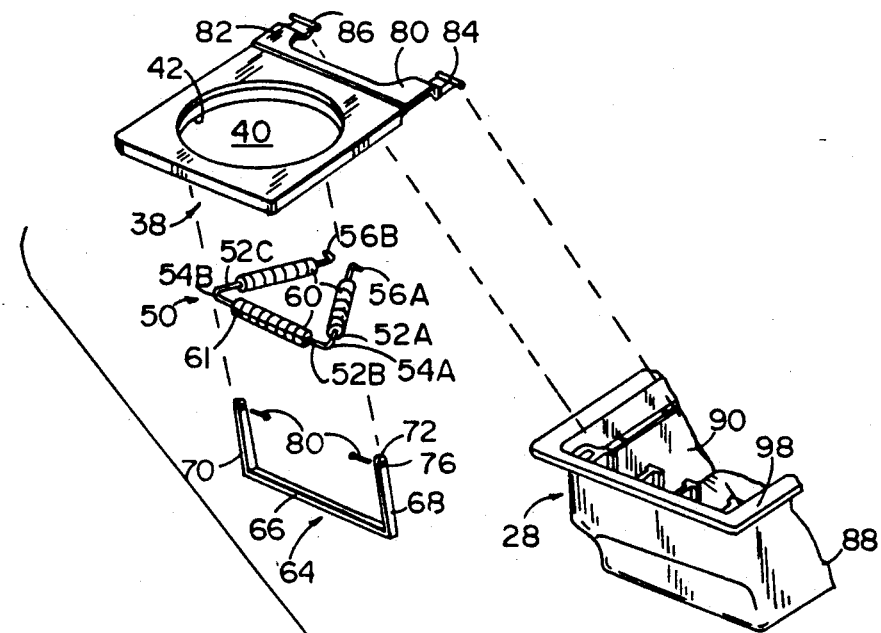
FIG. 5 is an exploded perspective view of the container holder.
Figure 4:
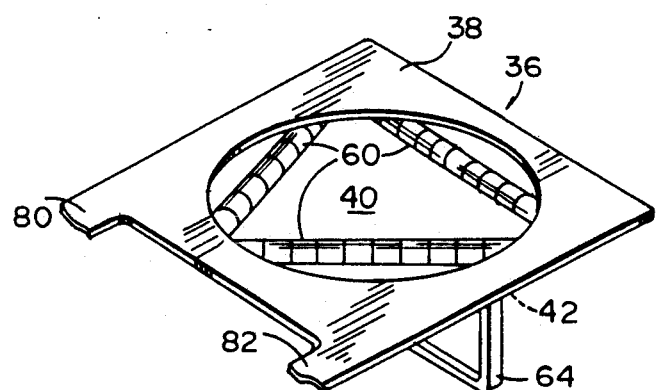
FIG. 4 is an enlarged fragmentary perspective view of the container holder.
Figure 6:
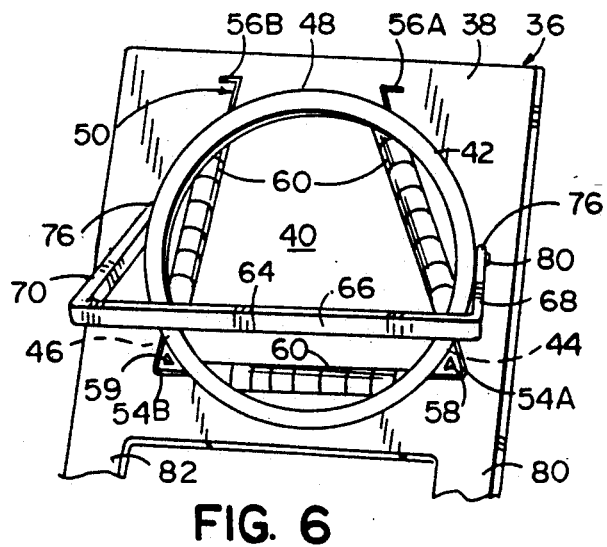
FIG. 6 is an enlarged fragmentary bottom plan view of the container holder shown in FIG. 4.

The container holder 36, as best seen in FIGS. 4–6, comprises a generally planar container supporting platform 38 having a central circular aperture 40 extending downwardly therethrough and having a diameter slightly larger than the diameter of the largest beverage container desired to be held therein. A circular rim or ridge 42 extends downwardly from the underside of platform 38 and is coaxially aligned around aperture 40. Three horizontal slots 44, 46 and 48 (FIG. 6) are equally spaced around circular rim 42 and extend radially and horizontally through rim 42. Slots 44, 46, and 48 each circumscribe an arc of about 30 degrees.

A resilient elongated member such as a spring steel wire 50 (FIGS. 5 and 6) includes a plurality of rollers 60 inserted thereon, and is subsequently formed into a triangular shape with legs 52A, 52B and 52C, which are joined at corners 54A and 54B, and terminate at ends 56A and 56B. Ends 56A and 56B are bent laterally to form a hook-like retainer. Wire 50 is resiliently, elastically deformable so that once corners 54A and 54B are inserted into slots 44 and 46, ends 56A and 56B can be compressed toward each other and inserted into slot 48. This step of inserting wire 50 into slots 44, 46 and 48 of rim 42 can be accomplished in a number of ways. For example, it can be done by extending corners 54A and 54B "too far" into slots 44 and 46, respectively, until ends 56A and 56B can fit into slot 48. Wire 50 is then readjusted on rim 42 as needed to center wire 50 around aperture 40. Once ends 56A and 56B are released, they spring apart engaging the sides of slot 48 to retain wire 50 in position on rim 42 and under aperture 40.

Protrusions 58 and 59 are added adjacent slots 44 and 46 with corners 54A and 54B extending around protrusions 58 and 59, respectively, to further securely locate wire 50 on rim 42. In such case, corners 54A and 54B are slipped over and past protrusions 58 and 59 as corners 54A and 54B are inserted at an angle into slots 44 and 46 in rim 42. Corners 54A and 54B then engage protrusions 58 and 59 as wire 50 is moved to a level position as ends 56A and 56B are installed.

A plurality of bead-like donut-shaped toroidal rollers 60 (FIG. 5) are slid onto wire 50 to fill a substantial portion of each of the legs 52A, 52B and 52C. Rollers 60 are typically placed on wire 50 before forming corners 54A and 54B but could be added later depending upon the manufacturing techniques employed. Further, it is contemplated that rollers 60 could be slit, such as illustrated by slit 61 in FIG. 5, so that rollers 60 could be slipped onto wire 50 from a side after the bending of wire 50. Still further, it is contemplated that the rollers on each segment 52A, 52B and 52C could be formed from an elongated tubular sleeve, such that a single roller 60 is employed for each leg of the triangular container support. Preferably, however, a plurality of rollers are employed which provide the best feel for the container holder.

It is contemplated that rollers 60 and wire 50 will be chosen in combination to optimize performance depending upon the particular insertion and removal characteristics desired for container holder 20. For example, rollers 60 can be made of a soft felt, sponge-like rubber, or a hard plastic, while wire 50 can be made of different diameter strands having different stiffness and elasticity. Further, wire 50 need not be made of steel, but could be made of a rubber band or string. Thus, the frictional characteristics between rollers 60, wire 50, and the container placed therein can be designed to generate a desired and characteristic insertion and removal force. As an example, a thick diameter wire 50 used with rubber rollers 60 will offer considerably more resistance to inserting a container therein than a thin flexible wire or rubber band 50 with hard plastic rollers 60 thereon. Additionally, legs 52A, 52B and 52C of wire 50 can be shaped such as in a curve to extend further into aperture 40 than the chordal segment illustrated to further select the insertion/removal characteristics of the container holder.

Figure 2:
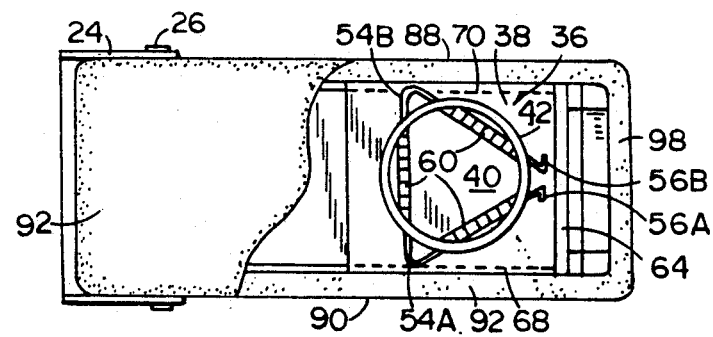
FIG. 2 is a top plan view of the structure shown in FIG. 1 shown partly broken-away to show the container holder in the stored position.

A container bottom supported bail 64 (FIG. 5) including cross bar 66 and legs 68 and 70 is pivotally attached to rim 42 as best seen in FIG. 6. Legs 68 and 70 each include an upper terminal end 72 with hole 76 therein. Pins 80 extend through hole 76 into opposing sides of rim 42 for pivotally connecting bail 64 to platform 38. As container holder 36 pivots closed to the storage position (FIG. 2), bail 64 pivots to a compact storage position adjacent the underside of platform 38 straddling circular rim 42. As container holder 36 is pivoted open to the extended use position (FIGS. 3 and 4), bail 64 drops downwardly under aperture 40 to support containers placed therein.

Figure 3:
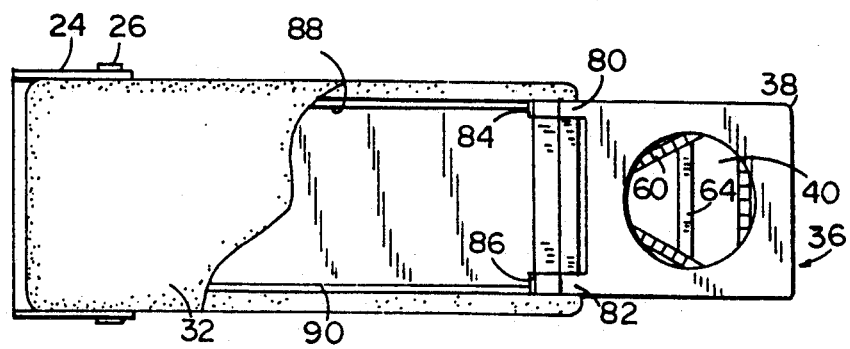
FIG. 3 is a reduced top plan view, partly broken-away, of the structure shown in FIG. 2 showing the container holder in an extended use position.

Platform 38 includes a pair of rearwardly projecting arms 80 and 82 which are pivotally coupled by pivot pins 84 and 86, respectively, to the top and front of sidewalls 88 and 90 of housing 28. Thus, the holder 36 can be pivoted to a stored position shown in FIG. 2 and in phantom form in FIG. 1 and concealed by the cover 32 of armrest assembly 20, or pivoted outwardly to a horizontally extended use position as illustrated in FIGS. 1 and 3 for receiving a container. In the stored position, the edges of rectangular platform 38 are supported by the tops of sidewalls 88 and 90 which are covered by a suitable padded upholstery material such as material 92 on cover 32 to conform the armrest to the interior of the vehicle in which the armrest is installed. In the use position, typically the cover 32 of the armrest will be closed and the rearwardly extending arms 80 and 82 include an "S"-shaped curved section 94 as best seen in FIG. 1 to conceal the pivot connections 84 and 86 within housing 28 and allow the arms to be supported on the top lip 98 of the front wall 34 of housing 28.

The cupholder 36 is integrally formed of a suitable polymeric material such as expanded polyvinylchloride and can be molded as a single piece including the pivot rods 84 and 86. Legs 80 and 82 are sufficiently resilient to allow the legs to be inwardly deflected for snap fitting them into apertures formed in walls 88 and 90 of housing 28.

In operation, cover 32 of armrest 20 is pivoted open and container holder 36 is pivoted outwardly in front of armrest 20 to a use position. As container holder 36 is pivoted outwardly, bail 64 drops downwardly by gravity to a use position under aperture 40. As a container is initially inserted into aperture 40, the sidewalls of the container engage rollers 60 causing rollers 60 to rotate on resilient wire 50. Also, resilient wire legs 52A, 52B and 52C flex outwardly and rollers 60 deform slightly as the container is forced into aperture 40. The container is moved downwardly into aperture 40 until the bottom of the container engages cross bar 66 of bail 64. The opposite sequence occurs when removing a container.

When finished with using container holder 36, the container holder 36 is pivoted into storage compartment 30 of armrest 20. As container holder 36 is pivoted to the storage position, bail 64 pivots to a position adjacent the side of planar container supporting element 38 with legs 68 and 70 of bail 64 straddling circular rim 42.

Thus, a container holder is provided with stabilizing elements that rollably engage the sidewalls of a container to securely hold the container in position and yet allows its uniform and easy removal. In the preferred embodiment of the invention, the holder is particularly adapted for mounting to a luxury vehicle armrest to pivot from a stored position and close within the armrest to an extended position which extends from the armrest for supporting a beverage container.

It will become apparent to those skilled in the art that various modifications to the preferred embodiment can be made without departing from the spirit or scope thereof as defined by the appended claims.

I claim:

1. A container holder for a vehicle comprising:
    a container supporting element including aperture means for receiving a beverage container and means for supporting the bottom of a beverage container when in said container supporting element;
    a plurality of roller means and means for rotatably mounting said roller means to said container supporting element adjacent said aperture means such that said roller means can rollably engage the side of a beverage container being inserted into said container supporting element for removably holding a container; and means for mounting said container supporting element to a vehicle.

2. A container holder as defined in claim 1 wherein said roller means have a generally toroidal shape with a central aperture.

3. A container holder as defined in claim 2 wherein said means for mounting said roller means position said roller means around said aperture means to centrally locate a container in said aperture means.

4. A container holder as defined in claim 3 wherein said means for mounting said roller means is made of a resilient material that deforms as a container is inserted into said aperture means.

5. A container holder defined in claim 3 wherein said means for mounting said roller means includes a resilient spring-like ember mounted to said container supporting element, and wherein said roller means are mounted to said resilient spring-like member.

6. A container holder as defined in claim 5 wherein said resilient spring-like member is a shaped wire.

7. A container holder as defined in claim 6 wherein said shaped wire is deformable and said container supporting element is configured with slot means for receiving and retaining said shaped wire to said container supporting element.

8. A container holder as defined in claim 6 wherein said roller means are slit to allow placement of said roller means onto said wire from a side thereof.

9. A container holder as defined in claim 1 wherein said means for mounting said roller means includes a resilient elongated member attached to said container supporting element, said resilient elongated member extending at least partially around said aperture means and rotatably supporting said roller means.

10. A container holder as defined in claim 9 wherein said roller means are generally toroidally shaped.

11. A container holder as defined in claim 10 wherein said resilient elongated member extends through a center of said roller means and defines an axis of rotation for each said roller means, said axes of rotation being substantially perpendicular to the line of insertion defined by inserting a container into said aperture means.

12. A container holder defined in claim 11 wherein said resilient elongated member includes a shaped wire.

13. A container holder as defined in claim 9 wherein said elongated member is resiliently deformable and said container supporting element is configured with slot means for receiving and attaching said elongated member to said container supporting element.

14. A container holder as defined in claim 1 including friction means for generating a frictional force on said roller means which must be overcome to rotate said roller means in order to insert or remove a container.

15. A container holder for a vehicle comprising:

a container supporting element including aperture means for receiving a container;

a plurality of roller means and means for rotatably mounting said roller means to said container supporting element adjacent said aperture means such that said roller mans rollably engage the sides of a container being inserted into said aperture means for removably holding a container;

means for mounting said container supporting element to a vehicle; and a housing for attachment to a vehicle, said means for mounting including means for moving said container supporting element between a stored position at least partially within said housing and an extended position extended from said housing.

16. A container holder as defined in claim 15 including a bail pivotally mounted to said container supporting element and movable between a lowered position for use under said aperture means and a raised position for compact storage adjacent said container supporting element when said container support element is in said stored position.

17. A container holder for a vehicle comprising:

a container supporting element including a marginal edge defining an aperture therein for receiving a container, and a bail means for supporting a container bottom when a container is placed in the aperture;

an elongated member attached to said container supporting element and extending along at least a portion of said marginal edge, said elongated member including a plurality of segments; and rollers rotatably mounted on said segments of said elongated member, a portion of each of said rollers extending inwardly into said aperture for engaging the side of a container placed in said aperture.

18. A container holder as defined in claim 17 wherein said rollers are resiliently deformable.

19. A container holder as defined in claim 17 wherein said supporting element includes a rim formed adjacent said aperture and wherein said rim includes a plurality of slots for receiving said resilient elongated member.

20. A container holder as defined in claim 17 wherein said resilient elongated member is a wire bent into a geometric shape around said aperture.

21. The apparatus as defined in claim 17 wherein said means for mounting includes means for movably mounting said container supporting element to the vehicle.

22. A container holder for mounting to a vehicle component comprising:

a platform movably mounted to the vehicle component, said platform including a rim defining an aperture therein for receiving a beverage container;

means for supporting the bottom of a beverage container;

a resilient elongated member supported by said rim and shaped to define chordal segments around said aperture, said elongated member including means for engaging the side of a beverage container placed into said aperture for releasably securely holding the beverage container therein; and roller means located on each of said chordal segments of said elongated member.

23. The apparatus as defined in claim 22 wherein said elongated member comprises a wire.

24. The apparatus as defined in claim 23 wherein said roller means comprises a plurality of rollers on each chordal segment of said wire.

25. The apparatus as defined in claim 24 wherein said wire is formed in the shape of a triangle and includes free ends with hooks formed therein for attaching said wire to said rim.

* * * * *

UNITED STATES PATENT AND TRADEMARK OFFICE
CERTIFICATE OF CORRECTION

PATENT NO. : 5,259,579

DATED : November 9, 1993

INVENTOR(S) : Robert J. Schneider

It is certified that error appears in the above-identified patent and that said Letters Patent is hereby corrected as shown below:

Column 5, line 16;
    After "holder" insert --as--.

Column 5, line 18;
    "ember" should be --member--.

Column 5, line 64, claim 15;
    "roller mans" should be --roller means--.

Signed and Sealed this

Fifth Day of July, 1994

Attest:

BRUCE LEHMAN

*Attesting Officer*    *Commissioner of Patents and Trademarks*